(12) United States Patent
Permuy et al.

(10) Patent No.: US 9,312,705 B2
(45) Date of Patent: Apr. 12, 2016

(54) CAPACITOR BALANCING CIRCUIT AND CONTROL METHOD FOR AN ELECTRONIC DEVICE SUCH AS A MULTILEVEL POWER INVERTER

(75) Inventors: Alfred Permuy, Rueil-Malmaison (FR); Luke Solomon, New Kensington, PA (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 775 days.

(21) Appl. No.: 13/329,979

(22) Filed: Dec. 19, 2011

(65) Prior Publication Data

US 2012/0161858 A1    Jun. 28, 2012

Related U.S. Application Data

(60) Provisional application No. 61/426,035, filed on Dec. 22, 2010.

(51) Int. Cl.
| | |
|---|---|
| *H02J 7/00* | (2006.01) |
| *H02J 7/06* | (2006.01) |
| *G01R 31/36* | (2006.01) |
| *G01R 19/00* | (2006.01) |
| *H02M 7/483* | (2007.01) |

(52) U.S. Cl.
CPC ............. *H02J 7/0014* (2013.01); *H02M 7/483* (2013.01)

(58) Field of Classification Search
CPC ........ H02J 7/0014; H02J 7/0016; H02J 7/345
USPC ......... 320/166, 167, 152, 157–159, 162–164; 702/63, 64
See application file for complete search history.

(56) References Cited

U.S. PATENT DOCUMENTS

| 3,405,343 A | 10/1968 | Boksjo |
| 4,203,151 A | 5/1980 | Baker |

(Continued)

FOREIGN PATENT DOCUMENTS

| CN | 101232193 A | 7/2008 |
| EP | 1005132 A3 | 10/2001 |
| EP | 2594007 A2 | 5/2013 |

OTHER PUBLICATIONS

EP Search Report issued in connection with corresponding EP Patent Application No. 11851394.4 dated on Jul. 9, 2014.

(Continued)

*Primary Examiner* — Richard V Muralidar
(74) *Attorney, Agent, or Firm* — Parks Wood LLC

(57) ABSTRACT

A method of balancing voltages in a group of capacitors of a power electronic device, such as a multilevel power inverter, includes making a balancing determination regarding whether to (i) inject energy into the selected one of the capacitors from an energy storage element, or (ii) extract energy from the selected one of the capacitors into the energy storage element based on the voltage of a selected one of the capacitors, and either injecting energy into the selected one of the capacitors from the energy storage element, or extracting energy from the selected one of the capacitors into the energy storage element based on the balancing determination. Also, a voltage balancing circuit that implements the method. In one particular implementation, a spatial second derivative algorithm is used. In another particular implementation, a comparison to an average capacitor voltage is used.

28 Claims, 12 Drawing Sheets

(56) References Cited

U.S. PATENT DOCUMENTS

| | | | |
|---|---|---|---|
| 4,313,155 A | 1/1982 | Bock et al. |
| 4,336,513 A | 6/1982 | Regan |
| 4,481,460 A | 11/1984 | Kroning et al. |
| 5,126,585 A | 6/1992 | Boys |
| 5,359,294 A | 10/1994 | Ganger et al. |
| 5,481,448 A | 1/1996 | Nakata et al. |
| 5,532,575 A | 7/1996 | Ainsworth et al. |
| 5,568,035 A | 10/1996 | Kato et al. |
| 5,621,628 A | 4/1997 | Miyazaki et al. |
| 5,627,742 A | 5/1997 | Nakata et al. |
| 5,644,483 A | 7/1997 | Peng et al. |
| 5,675,239 A | 10/1997 | Kim et al. |
| 5,684,688 A | 11/1997 | Rouaud et al. |
| 5,710,504 A | 1/1998 | Pascual et al. |
| 5,841,645 A | 11/1998 | Sato |
| 5,869,950 A | 2/1999 | Hoffman, Jr. |
| 5,910,892 A | 6/1999 | Lyons et al. |
| 6,005,362 A | 12/1999 | Enjeti et al. |
| 6,031,738 A | 2/2000 | Lipo et al. |
| 6,058,031 A | 5/2000 | Lyons et al. |
| 6,225,781 B1 | 5/2001 | Okamura et al. |
| 6,288,921 B1 | 9/2001 | Uchino et al. |
| 6,314,007 B2 | 11/2001 | Johnson, Jr. et al. |
| 6,316,917 B1 | 11/2001 | Ohta |
| 6,323,623 B1 | 11/2001 | Someya et al. |
| 6,404,170 B2 | 6/2002 | Okamura et al. |
| 6,414,453 B1 | 7/2002 | Tamagawa et al. |
| 6,424,156 B1 | 7/2002 | Okamura |
| 6,430,066 B2 | 8/2002 | Emori et al. |
| 6,452,363 B1 | 9/2002 | Jabaji |
| 6,459,596 B1 | 10/2002 | Corzine |
| 6,518,725 B2 | 2/2003 | Marten |
| 6,534,949 B2 | 3/2003 | Szczesny et al. |
| 6,617,830 B2 | 9/2003 | Nozu et al. |
| 6,741,482 B2 | 5/2004 | Yamamoto et al. |
| 6,754,090 B2 | 6/2004 | Arai et al. |
| 6,777,912 B1 | 8/2004 | Yamada et al. |
| 6,777,917 B2 | 8/2004 | Desprez et al. |
| 6,791,210 B2 | 9/2004 | Stevenson et al. |
| 6,795,323 B2 | 9/2004 | Tanaka et al. |
| 6,806,686 B1 | 10/2004 | Thrap |
| 6,809,502 B2 | 10/2004 | Tsujii et al. |
| 6,842,354 B1 | 1/2005 | Tallam et al. |
| 6,885,170 B2 | 4/2005 | Okamura et al. |
| 6,995,994 B2 | 2/2006 | Bijlenga et al. |
| 7,040,391 B2 | 5/2006 | Leuthen et al. |
| 7,050,311 B2 | 5/2006 | Lai et al. |
| 7,126,833 B2 | 10/2006 | Peng |
| 7,206,705 B2 | 4/2007 | Hein |
| 7,216,833 B2 | 5/2007 | D'Ausilio et al. |
| 7,219,673 B2 | 5/2007 | Lemak |
| 7,271,505 B1 | 9/2007 | Miettinen |
| 7,313,008 B2 | 12/2007 | Steimer |
| 7,409,276 B2 | 8/2008 | Nishina et al. |
| 7,477,505 B2 | 1/2009 | Timmerman et al. |
| 7,482,816 B2 | 1/2009 | Odajima et al. |
| 7,495,418 B2 | 2/2009 | Yano et al. |
| 7,495,938 B2 | 2/2009 | Wu et al. |
| 7,531,987 B2 | 5/2009 | Ohasi et al. |
| 7,573,732 B2 | 8/2009 | Teichmann et al. |
| 7,583,057 B2 | 9/2009 | Morita |
| 7,586,770 B2 | 9/2009 | Toba et al. |
| 7,598,706 B2 | 10/2009 | Koski et al. |
| 7,599,168 B2 | 10/2009 | Doljack et al. |
| 7,619,907 B2 | 11/2009 | Urakabe et al. |
| 7,622,898 B2 | 11/2009 | Shimizu et al. |
| 7,646,165 B2 | 1/2010 | Ueda et al. |
| 7,663,268 B2 | 2/2010 | Wen et al. |
| 7,671,569 B2 | 3/2010 | Kolb et al. |
| 7,710,082 B2 | 5/2010 | Escobar Valderrama et al. |
| 7,741,811 B2 | 6/2010 | Daio |
| 7,751,212 B2 | 7/2010 | Perkinson |
| 7,777,456 B2 | 8/2010 | Morita et al. |
| 7,800,346 B2 | 9/2010 | Bolz et al. |
| 7,812,572 B2 | 10/2010 | Bolz et al. |
| 7,825,638 B2 | 11/2010 | Bolz et al. |
| 7,834,480 B2 | 11/2010 | Mandalakas et al. |
| 2004/0212352 A1 | 10/2004 | Anzawa et al. |
| 2004/0263121 A1 | 12/2004 | Thrap |
| 2005/0077879 A1 | 4/2005 | Near |
| 2005/0212493 A1 | 9/2005 | Yamaguchi et al. |
| 2007/0001651 A1* | 1/2007 | Harvey ............ 320/166 |
| 2007/0223258 A1 | 9/2007 | Lai et al. |
| 2008/0018301 A1 | 1/2008 | Morita |
| 2008/0018308 A1* | 1/2008 | Daboussi ............ 320/167 |
| 2008/0055947 A1 | 3/2008 | Wen et al. |
| 2008/0094042 A1 | 4/2008 | Ferrario |
| 2008/0205093 A1 | 8/2008 | Davies et al. |
| 2008/0211459 A1 | 9/2008 | Choi |
| 2008/0218176 A1 | 9/2008 | Ohashi et al. |
| 2008/0252266 A1 | 10/2008 | Bolz et al. |
| 2009/0086515 A1 | 4/2009 | Sakakibara |
| 2009/0134851 A1 | 5/2009 | Takeda et al. |
| 2009/0228221 A1* | 9/2009 | Kakiuchi et al. ........... 702/58 |
| 2009/0243548 A1 | 10/2009 | Hoff |
| 2009/0251099 A1 | 10/2009 | Brantner et al. |
| 2009/0273321 A1 | 11/2009 | Gotzenberger et al. |
| 2010/0090663 A1 | 4/2010 | Pappas et al. |
| 2010/0148582 A1 | 6/2010 | Carter |
| 2010/0207644 A1 | 8/2010 | Nestler et al. |
| 2010/0283434 A1 | 11/2010 | Kakiuchi |
| 2010/0321965 A1 | 12/2010 | Sakakibara |
| 2013/0114320 A1* | 5/2013 | Permuy ............ 363/131 |

OTHER PUBLICATIONS

Shukla A et al: 11 Control Schemes for DC Capacitor Voltages Equalization in Diode-Clamped Multilevel Inverter-Based DSTATCOM, IEEE Transactions on Power Delivery, IEEE Service Center, New York, NY, US, vol. 23, No. 2, Apr. 1, 2008, pp. 1139-1149, XP011204543.

Akagi H et al: "A 6.6-kV Transformerless STATCOM Based on a Five-Level Diode-Clamped PWM Converter: System Design and Experimentation of a 200-V 10-kVA Laboratory Model" IEEE Transactions on Industry Applications IEEE Service Center PiscatawayNJUS vol. 44, No. 2, Mar. 1, 2008 pp. 672-680, XP011280314.

Hasegawa K et al: "A new DC-voltage-balancing circuit including a single coupled inductor for a five-level diode-clamped PWM inverter" Energy Conversion Congress and Exposition 2889. ECCE. IEEE, IEEEPiscataway, NJ USA Sep. 20, 2009, pp. 2153-2159, XP031887872.

Gilberta E Urroz: "Numerical Solution to Ordinary Differential Equations". Sep. 1, 2004, XP055125654.

Ryszard Strzelecki, "Analysis of DC Link Capacitor Voltage Balance in Multilevel Active Power Filters", EPE 2001—Gratz, pp. 1-8.

Ashish Bendre, "Comparative Evaluation of Modulation Algorithms for Neutral-Point-Clamped Converters", IEEE Transactions on Industry Applications, Mar./Apr. 2005, pp. 634-643, vol. 41, No. 2.

A. Nami, "A New Configuration for Multilevel Converters With Diode Clamped Topology", In Proceedings 8th International Power Engineering Conference (IPEC 2007), pp. 661-665, Singapore.

H. Ertl, "Active voltage balancing of DC-link electrolytic capacitors", IET Power Electron., 2008, pp. 448-496, vol. 1, No. 4.

Unofficial English translation of Office Action issued in connection with corresponding CN Application No. 201180068243.3 on Dec. 16, 2014.

* cited by examiner

CAPACITOR BALANCING CIRCUIT AND CONTROL METHOD FOR AN ELECTRONIC DEVICE SUCH AS A MULTILEVEL POWER INVERTER

CROSS-REFERENCE TO RELATED APPLICATIONS

This application claims priority under 35 U.S.C. §119(e) from provisional U.S. patent application No. 61/426,035, entitled "Multilevel Power Converter Capacitor Balancing Circuit and Control Algorithm" and filed on Dec. 22, 2010, the contents of which are incorporated herein by reference.

BACKGROUND OF THE INVENTION

1. Field of the Invention

The present invention pertains to electronic devices that employ groups of capacitors to provide DC voltages, such as power electronic devices (e.g., a multi-level power inverter), and, in particular, to a method and circuit for balancing the charge on multiple capacitors of a capacitor bank of such an electronic device.

2. Description of the Related Art

A multilevel power inverter is a power electronic device that is structured to produce AC waveforms from one or more DC input voltages. Multilevel power inverters are used in a wide variety of applications, such as, without limitation, variable speed motor drives and as an interface between a high voltage DC transmission line and an AC transmission line.

The general concept behind a multilevel power inverter is to use a number of power semiconductor switches coupled to a number of lower level DC voltage sources to perform power conversion by synthesizing a staircase voltage waveform. A number of different topologies for implementing a multilevel power inverter are well known, including but not limited to the neutral point clamped (NPC) topology and the H-bridge topology.

As is known in the art, a bank of capacitors (the "DC link") coupled to one or more DC voltage inputs is often used to provide the multiple DC voltage sources required for operation of a multilevel power inverter. For example, it is known to use such a DC link comprising a bank of capacitors in the NPC topology described above. Under normal, sinusoidal operation, the DC link capacitor bank voltages of a multilevel inverter with more than three levels will tend to become unbalanced. As is known, operation of a multilevel power inverter with unbalanced voltages in the DC link capacitor bank will adversely affect the performance of the multilevel power inverter due to the generation of uncharacteristic harmonics in the inverter output voltage and the presence of overvoltage across the semiconductor switches.

One known approach to the capacitor balancing problem is to apply a specialized, multi-secondary winding transformer that inherently enforces capacitor voltage balancing across all power converter levels. A second known approach is to apply advanced control techniques to the load current in order to manage the energy flow in and out of the DC link capacitor banks. These solutions, however, have proven to be cost prohibitive and/or functionally inadequate in many applications.

SUMMARY OF THE INVENTION

In one embodiment, a method of balancing voltages in a group of capacitors of an electronic device, such as a multi-level power inverter, is provided that includes steps of determining a voltage spatial second derivative of a selected one of the capacitors with respect to a first remaining one of the capacitors and a second remaining one of the capacitors, making a balancing determination regarding whether to (i) inject energy into the selected one of the capacitors from an energy storage element, or (ii) extract energy from the selected one of the capacitors into the energy storage element based on the voltage spatial second derivative, and either injecting energy into the selected one of the capacitors from the energy storage element, or extracting energy from the selected one of the capacitors into the energy storage element based on the balancing determination.

In another embodiment, a balancing circuit for balancing voltages in a group of capacitors of an electronic device is provided that includes a plurality of electronic switching devices, an energy storage element coupled to the plurality of electronic switching devices, and a control unit operatively coupled to the plurality of electronic switching devices. The control unit controls the electronic switching devices and is programmed to determine a voltage spatial second derivative of a selected one of the capacitors with respect to a first remaining one of the capacitors and a second remaining one of the capacitors, make a balancing determination regarding whether to (i) inject energy into the selected one of the capacitors from an energy storage element, or (ii) extract energy from the selected one of the capacitors into the energy storage element based on the voltage spatial second derivative, and either control the electronic switching devices to cause energy to be injected into the selected one of the capacitors from the energy storage element, or control the electronic switching devices to cause energy to be extracted from the selected one of the capacitors into the energy storage element based on the balancing determination.

In another embodiment, a method of balancing voltages in a group of capacitors of an electronic device is provided. The method includes determining a voltage of a selected one of the capacitors, determining an average voltage of two or more of the capacitors (which may include the selected one of the capacitors), making a balancing determination regarding whether to (i) inject energy into the selected one of the capacitors from an energy storage element, or (ii) extract energy from the selected one of the capacitors into the energy storage element based on a comparison of the voltage to the average voltage, and either injecting energy into the selected one of the capacitors from the energy storage element, or extracting energy from the selected one of the capacitors into the energy storage element based on the balancing determination.

In still another embodiment, a balancing circuit for balancing voltages in a group of capacitors of an electronic device is provided. The balancing circuit includes a plurality of electronic switching devices, an energy storage element coupled to the plurality of electronic switching devices, and a control unit operatively coupled to the plurality of electronic switching devices, wherein the control unit controls the electronic switching devices. The control unit is programmed to determine a voltage of a selected one of the capacitors, determine an average voltage of two or more of the capacitors (which may include the selected one of the capacitors), make a balancing determination regarding whether to (i) inject energy into the selected one of the capacitors from an energy storage element, or (ii) extract energy from the selected one of the capacitors into the energy storage element based on a comparison of the voltage to the average voltage, and either control the electronic switching devices to cause energy to be injected into the selected one of the capacitors from the energy storage element, or control the electronic switching devices to cause energy to be extracted from the selected one of the capacitors into the energy storage element based on the balancing determination.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

Figure 1:
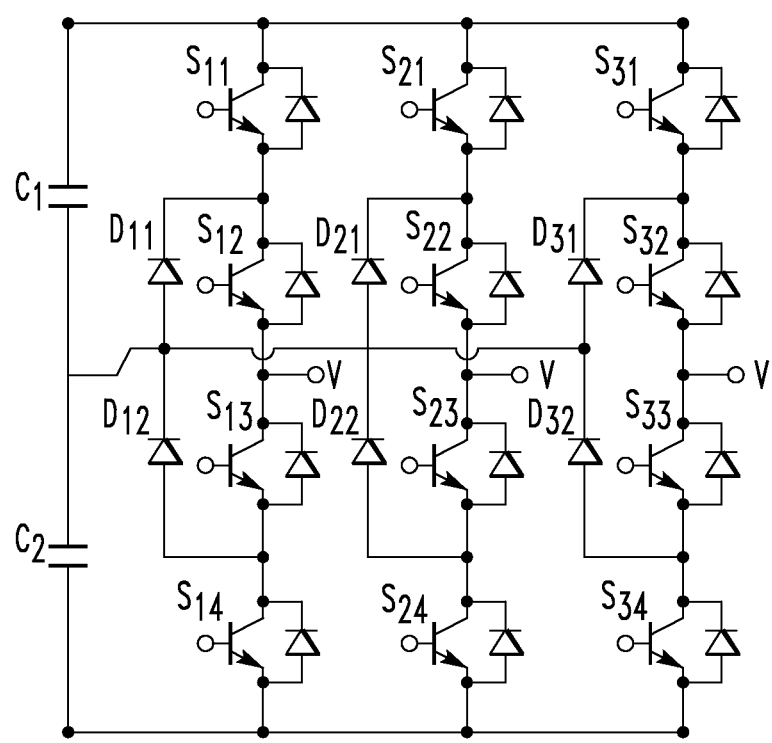
FIG. 1 is a schematic diagram of a prior art 3-phase, 3-level NPC type multilevel inverter.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention provides a capacitor balancing circuit and associated method that provides functionality to keep all DC link capacitor bank voltages within specified tolerance ranges. The method and circuit of the present invention may be employed with any set of series connected capacitors, and thus may be employed with any electronic device that includes such a set of series connected capacitors. For example, and without limitation, the method and circuit of the present invention may be employed with a power electronic device that includes series connected capacitors, such as, without limitation, a multilevel power inverter that employs a bank of capacitors to provide the needed DC voltage levels. For illustrative purposes, the capacitor balancing method and circuit of the present invention will be described in connection with a multilevel power inverter having a particular known topology, although it will be understood that this is meant to be exemplary only, and that other devices, including different multilevel power inverter topologies, are contemplated within the scope of the present invention.

As is known in the art, multilevel power inverters synthesize a staircase output voltage from several levels of DC capacitor voltages that are provided by a capacitor bank of the multilevel inverter. An m-level inverter (i.e., m voltage levels used to synthesize the staircase output voltage) consists of m−1 capacitors in the capacitor bank (the DC bus), 2(m−1) switching devices per phase, and 2(m−2) clamping diodes per phase. FIG. 1 is a schematic diagram of a prior art 3-phase, 3-level NPC inverter (i.e., m=3), labeled with reference numeral 2. As seen in FIG. 1, the DC voltage bus is split into three levels (i.e., m=3) by using two (i.e., m−1) DC capacitors C1 and C2. Each capacitor has $V_{dc}/2$ volts, and the output voltage has three states (0 volts, $+V_{dc}/2$ volts, $-V_{dc}/2$ volts) that are used to construct the AC output staircase. In addition, each phase leg has four switching devices (i.e., 2(m−1)) and two clamping diodes (i.e., 2(m−2)).

Figure 2:
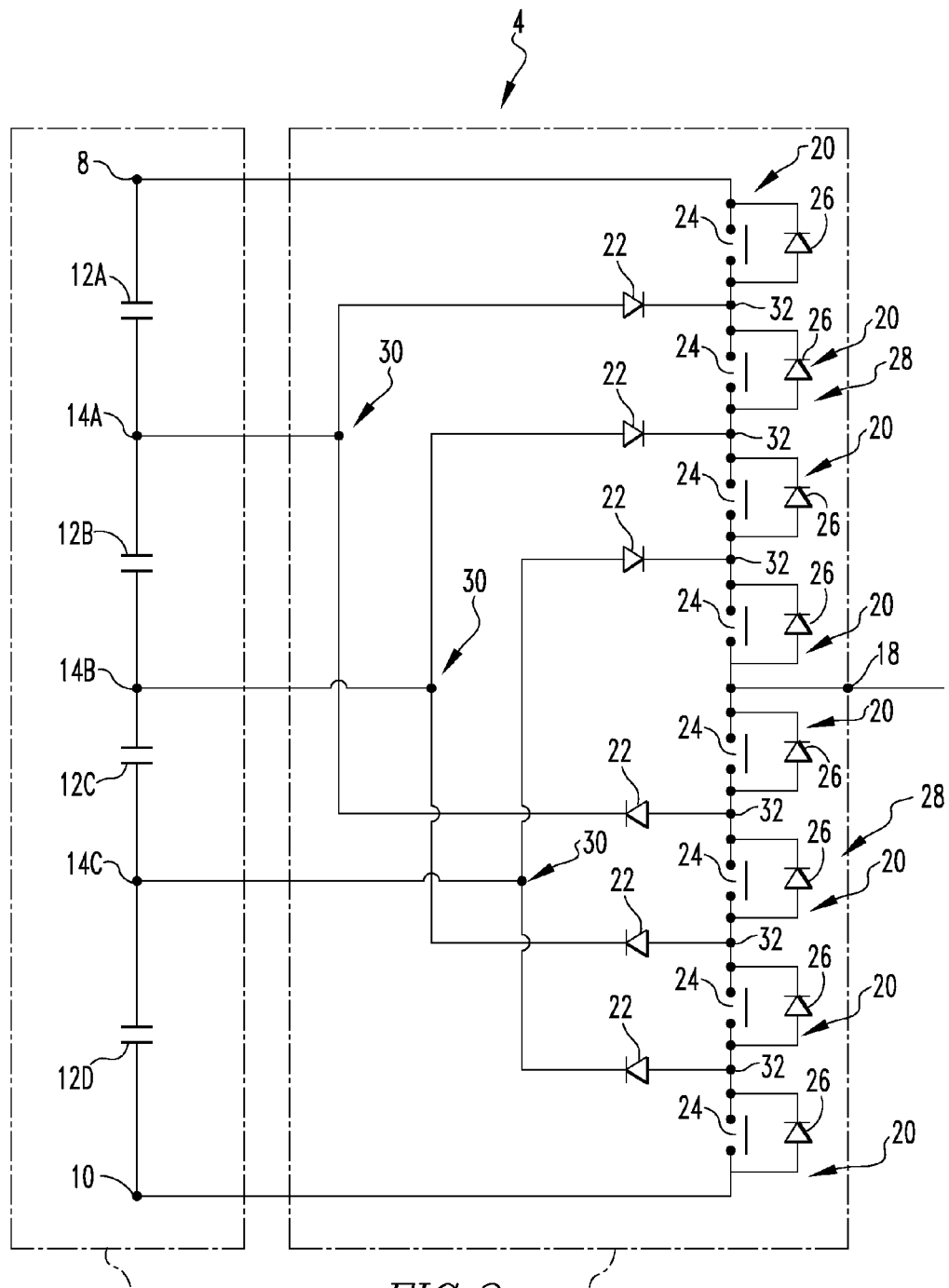
FIG. 2 is a schematic diagram of a prior art 3-phase, 5-level multilevel power inverter.

As is also known in the art, the number of levels of a multilevel power inverter can be increased by providing additional capacitors, switching devices and clamping diodes. FIG. 2 is a schematic diagram of one phase leg of a known 5-level multilevel power inverter topology (i.e., m=5), labeled with reference numeral 4. For illustrative purposes, multilevel power inverter 4 having the topology shown will be used when describing the multilevel power inverter capacitor balancing circuit and associated method of the present invention. It will be understood, however, that that is meant to be exemplary only and that multilevel power inverters having different voltage levels (i.e., any number of levels where m≥3) and/or different topologies and/or layouts (i.e., different than that shown in FIG. 2) may be employed within the scope of the present invention. For example, and without limitation, U.S. Provisional Application No. 61/426,051, filed on Dec. 22, 2010, and U.S. Provisional Application No. 61/501,876, filed on Jun. 28, 2011, each owned by the assignee of the present invention and entitled "Mechanical Arrangement of a Multilevel Power Converter Circuit," describe particular alternative mechanical arrangements for a multilevel power inverter, and it will be understood that the capacitor balancing circuit and method described herein may be employed with such multilevel power inverter arrangements.

The disclosures of U.S. Provisional Application Nos. 61/426,051 and 61/501,876, and U.S. patent application Ser. No. 13/329,422, filed on the same date herewith and claiming priority under 35 U.S.C. §119(e) to the provisional applications just identified, are incorporated herein by reference in their entirety.

Referring to FIG. 2, 5-level multilevel power inverter 4 includes a capacitor bank 6 having a positive input terminal 8, a negative input terminal 10, four DC capacitors 12A, 12B, 12C and 12D, and intermediate points 14A, 14B, 14C. 5-level multilevel power inverter 4 also includes a changeover module 16 that includes an output terminal 18, eight (i.e., 2(m−1)) switching devices 20 (which in the illustrated embodiment are each a transistor 24, such as an IGBT, and a diode 26 connected in an anti-parallel relationship to the transistor 24), and six (i.e., 2(m−2)) clamping diodes 22. More specifically, in the illustrated embodiment, in changeover module 16, the switching devices 20 and the clamping diodes 22 are arranged in two end branches 28 and three (i.e., m−2) intermediate branches 30. Each intermediate branch 30 is connected to a respective intermediate point 14A, 14B, 14C of the capacitor group and comprises two of the clamping diodes 22. A first diode 22 is connected in-line between the respective intermediate point 14A, 14B, 14C and a respective midpoint 32 of one of the two end branches 28, and the second diode 22 is connected in reverse between the respective intermediate point 14A, 14B, 14C of the midpoint 32 of the other of the two end branches 28. In operation, each capacitor 12A, 12B, 12C, 12D has $V_{dc}/4$ volts, and the output voltage of 5-level multilevel power inverter 4 has five states (0 volts, $+V_{dc}/4$ volts, $-V_{dc}/4$ volts, $+V_{dc}/2$ volts, and $-V_{dc}/2$ volts) that are used to construct the AC output staircase at output terminal 18.

Figure 3A:
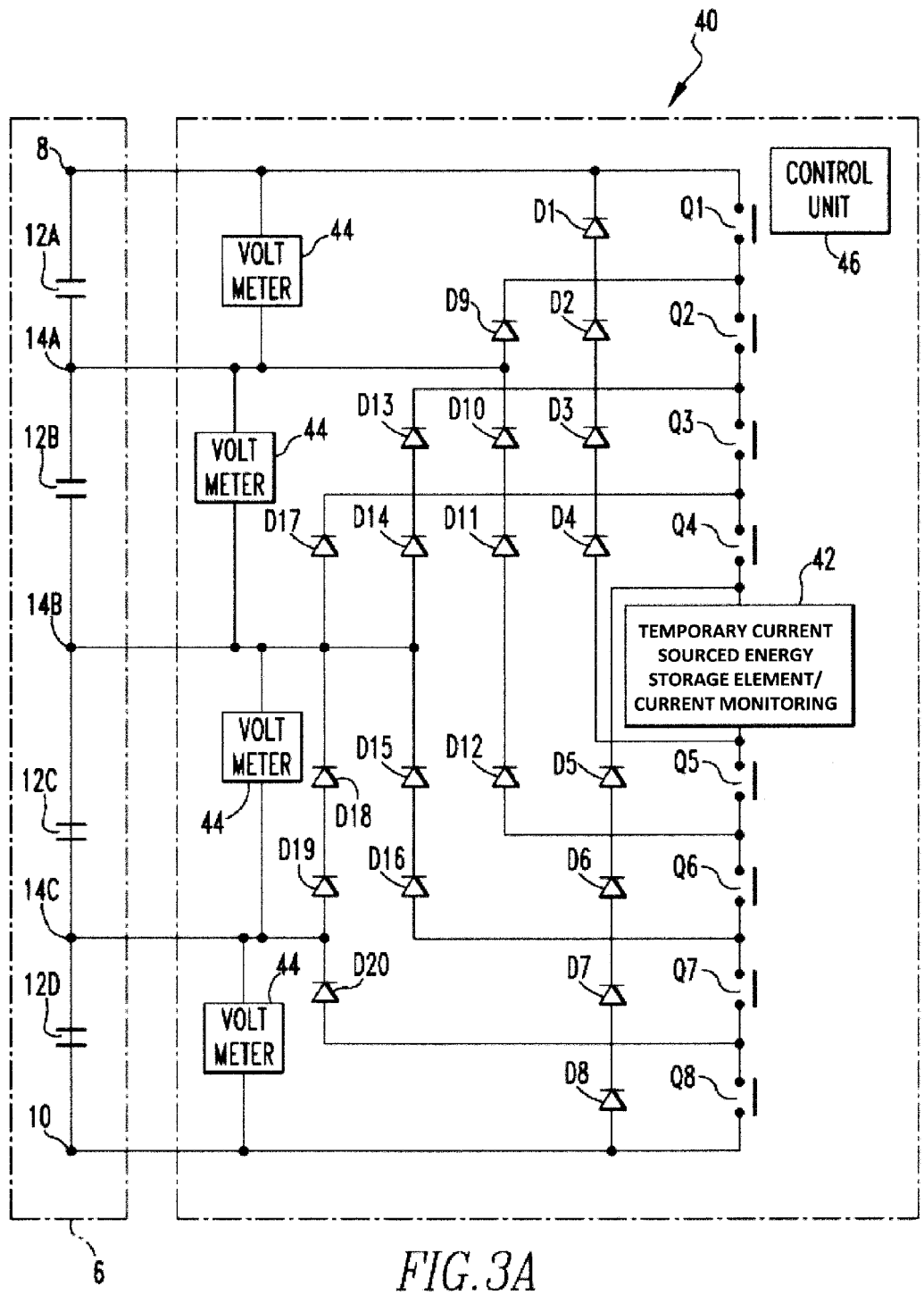
FIGS. 3A-3C are schematic diagrams showing a capacitor balancing circuit according to various exemplary embodiments of the present invention.

FIG. 3A is a schematic diagram showing a capacitor balancing circuit 40 according to the exemplary embodiment of the present invention that is coupled to capacitor bank 6 described above. As described in detail herein, capacitor balancing circuit 40 is structured to balance the charge on each of the capacitors 12A, 12B, 12C, 12D of capacitor bank 6 by keeping the voltage of each of the capacitors 12A, 12B, 12C, 12D within specified tolerance ranges. As also described in detail herein, this is done by injecting energy into or withdrawing energy from each of the capacitors 12A, 12B, 12C, 12D as needed as determined by the method of the present invention.

Referring to FIG. 3A, capacitor balancing circuit 40 includes 2(m−1) (i.e., eight) electronic switching devices labeled Q1-Q8 in FIG. 3A provided in between positive input terminal 8 and negative input terminal 10. As seen in FIG. 3A, Q1-Q4 are all in series and Q5-Q8 are all in series, but Q4 is not in series with Q5. In FIG. 3A, electronic switching devices Q1-Q8 are shown as ideal switches. Such electronic switching devices Q1-Q8 may be any type of suitable switching devices, such as, for example and without limitation, Insulated Gate Bipolar Transistors (IGBTs) as shown in the exemplary embodiment of FIG. 3B, Metal Oxide Semiconductor Field Effect Transistors (MOSFETS), another type of semiconductor switching device, or Micro-ElectroMechanical System (MEMS) switches. Capacitor balancing circuit 40 further includes twenty diodes labeled D1-D20 and connected as shown in FIG. 3A. In addition, capacitor balancing circuit 40 also includes a temporary current sourced energy storage element 42 provided in between two nodes located in between switching devices Q4 and Q5. Temporary current sourced energy storage element 42 may be, for example and without limitation, an electrical inductor that stores energy in the form of a magnetic field, or some other type of reactor device. Alternatively, temporary current sourced energy storage element 42 could be a complex power electronic system itself. In addition, a current measuring means, such as an amp meter, for measuring the current flowing through temporary current sourced energy storage element 42 may also be provided.

Capacitor balancing circuit 40 still further includes a plurality of volt meters 44 (or other suitable voltage measuring devices) that are each structured to measure the voltage level of the associated one of the capacitors 12A, 12B, 12C, 12D. Finally, capacitor balancing circuit 40 includes a control unit 46, such as, without limitation, a microprocessor, a microcontroller, or some other suitable processing device, that is coupled to and controls the switching of switching devices Q1-Q8 as described herein. In addition, although not shown in FIG. 3A, the outputs of the volt meters 44 are provided to control unit 46.

Capacitor balancing circuit 40 is shown with diodes D1-D20 that are rated (implied because of the number of them) for a single Vdc/4 level. For many reasons, including but not limited to voltage or current ratings, each single circuit element in FIG. 3A could be replaced with multiple series and/or parallel combinations of that circuit element. Adding these combinations of circuit elements does not change the logical functionality of the circuit shown in FIG. 3A and described herein.

In addition, as seen in FIG. 3A, switching devices Q1, Q2, Q3, and Q4 and diodes D5, D6, D7, D8, D9, D13, D14, D17, D18, and D19 comprise a first current carrying means structured to, under the control of control unit 46, extract electrical charge from an intermediate point 14A, 14B, 14C and positive input terminal 8 and negative input terminal 10 and deliver it to temporary current sourced energy storage element 42. Similarly, switching devices Q5, Q6, Q7, and Q8 and diodes D1, D2, D3, D4, D10, D11, D15, D16, and D20 comprise a second current carrying means structured to, under the control of control unit 46, inject electrical charge from temporary current sourced energy storage element 42 to an intermediate point 14A, 14B, 14C and positive input terminal 8 and negative input terminal 10.

According to an aspect of the present invention, capacitor balancing circuit 40 determines the presence of voltage imbalance with respect to each capacitor 12A, 12B, 12C, 12D in capacitor bank 6 and determines whether it is necessary to inject energy into or withdraw energy from a particular capacitor 12A, 12B, 12C, 12D via the temporary current sourced energy storage element 42 (through the first or second current carrying means just described) by controlling the states of various switching devices Q1-Q8.

Figure 4:
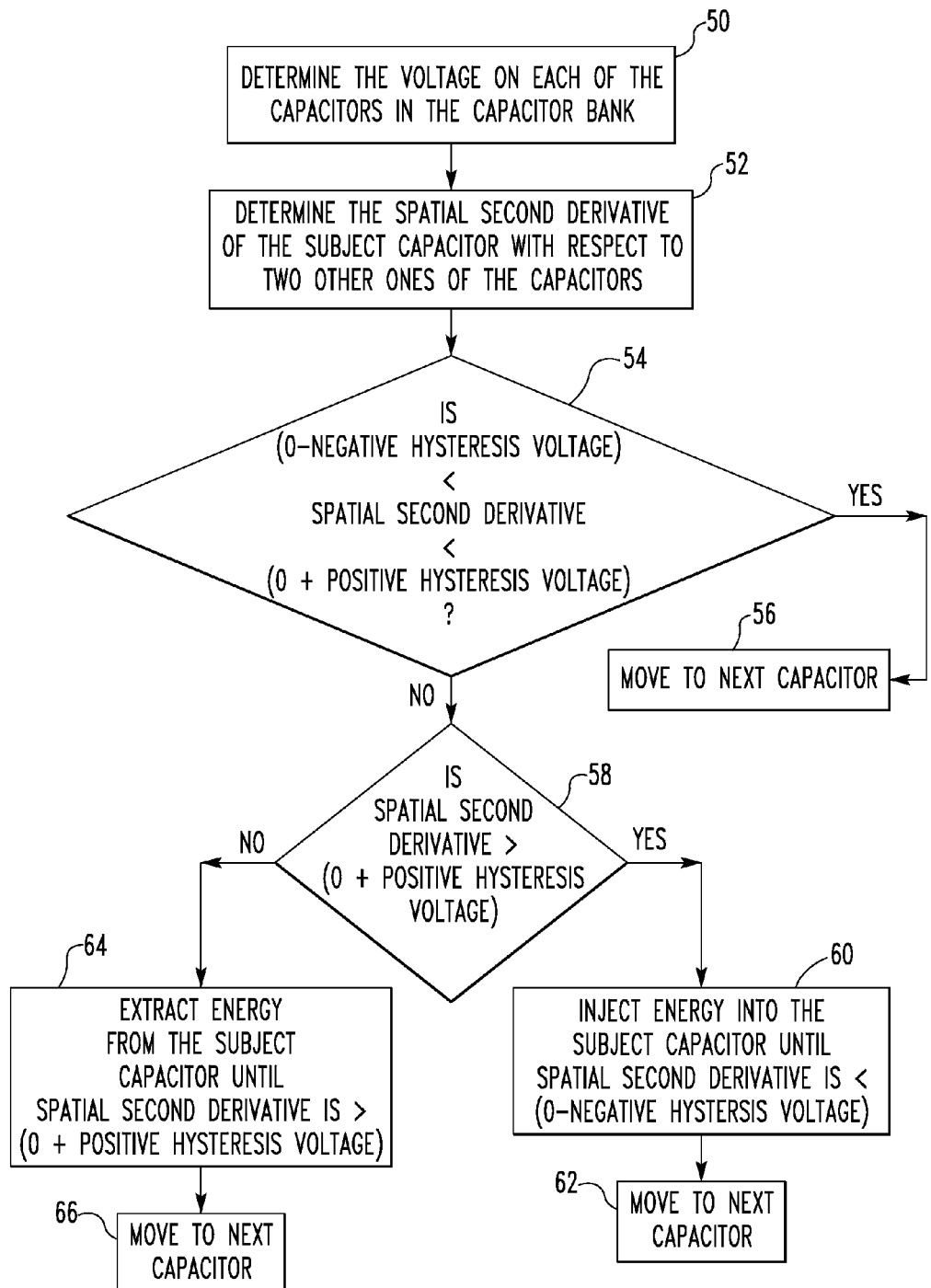
FIG. 4 is a flowchart showing a method of operating the capacitor balancing circuit of FIGS. 3A-3C according to one exemplary embodiment of the invention.

FIG. 4 is a flowchart showing one method of operating capacitor balancing circuit 40 to balance the voltage on capacitors 12A, 12B, 12C, 12D according to one exemplary embodiment of the invention. As described below, the method of FIG. 4 determines whether to inject energy into or discharge energy from a particular capacitor 12A, 12B, 12C, 12D based on a capacitor voltage spatial second derivative algorithm wherein a voltage spatial second derivative of the capacitor is determined with respect to any two of the other capacitors in the group. For example, the voltage spatial second derivative of the capacitor may be determined with respect to its two nearest neighboring capacitors. This is, however, exemplary only, and it will be understood that the other two capacitors need not be neighboring capacitors. As will be appreciated, in the exemplary embodiment, the method is implemented in a number of software routines in control unit 46.

More specifically, referring to FIG. 4, the method, as applied to one particular capacitor 12A, 12B, 12C, 12D (for illustrative purposes, capacitor 12A will be used), and as implemented in control unit 46 begins at step 50, wherein the voltage on each of the capacitors 12A, 12B, 12C, 12D is determined by the associated volt meter 44 and provided to control unit 46. Next, at step 52, the voltage spatial second derivative of the subject capacitor (12A) with respect to two other ones of the capacitors (e.g., without limitation, each of its two nearest neighboring capacitors (12B and 12D in the example)) is determined. In the exemplary embodiment, the voltage spatial second derivative of a capacitor c with respect to two other ones of the capacitors is determined as follows: $d^2Vc/dx^2=((V$ of other capacitor 1)$-(2*Vc)+(V$ of other capacitor 2))/(spacing constant)$^2$, where the spacing constant is equal for all spatial second derivatives of a given system of DC link capacitors. The spacing constant can be arbitrarily chosen as any non-zero number.

Next, at step 54, a determination is made as to whether the voltage spatial second derivative determined in step 52 is greater than zero minus a negative hysteresis voltage and less than zero plus a positive hysteresis voltage. If the answer is yes, then the method proceeds to step 56, where the method is repeated for the next capacitor 12A, 12B, 12C, 12D (e.g., 12B).

If the answer at step 54 is no, then the method proceeds to step 58, where a determination is made as to whether the voltage spatial second derivative determined in step 52 is >zero plus a positive hysteresis voltage. If the answer is yes, then the method proceeds to step 60. At step 60, energy is injected into the subject capacitor (12A) from temporary current sourced energy storage element 42 until the voltage spatial second derivative (as continually monitored) becomes less than zero minus a negative hysteresis voltage. This injection of energy is accomplished by controlling the states of the switching devices Q1-Q8 so that energy is caused to be injected into the appropriate capacitor (12A in the example) via the second current carrying means described above. Once the voltage spatial second derivative becomes less than zero minus a negative hysteresis voltage, the method proceeds to step 62, where the method is repeated for the next capacitor 12A, 12B, 12C, 12D (e.g., 12B). Alternatively, at step 60, energy could injected into the subject capacitor (12A) from temporary current sourced energy storage element 42 until the voltage spatial second derivative (as continually monitored) becomes less than zero plus a positive hysteresis voltage.

If the answer at step 58 is no, then that means that the voltage spatial second derivative determined in step 52 is <zero minus a negative hysteresis voltage, and the method proceeds to step 64. At step 64, energy is extracted from (i.e., discharged from) the subject capacitor (12A) into temporary current sourced energy storage element 42 until the voltage spatial second derivative (as continually monitored) becomes greater than zero plus a positive hysteresis voltage. This extraction of energy is accomplished by controlling the states of the switching devices Q1-Q8 so that energy is caused to be discharged from the appropriate capacitor (12A in the example) and into temporary current sourced energy storage element 42 via the first current carrying means described above. Once the voltage spatial second derivative becomes greater than zero plus a positive hysteresis voltage, the method proceeds to step 66, where the method is repeated for the next capacitor 12A, 12B, 12C, 12D (e.g., 12B). Alternatively, at step 64, energy may be extracted from (i.e., discharged from) the subject capacitor (12A) into temporary current sourced energy storage element 42 until the voltage spatial second derivative (as continually monitored) becomes greater than zero minus a negative hysteresis voltage.

Figure 9:
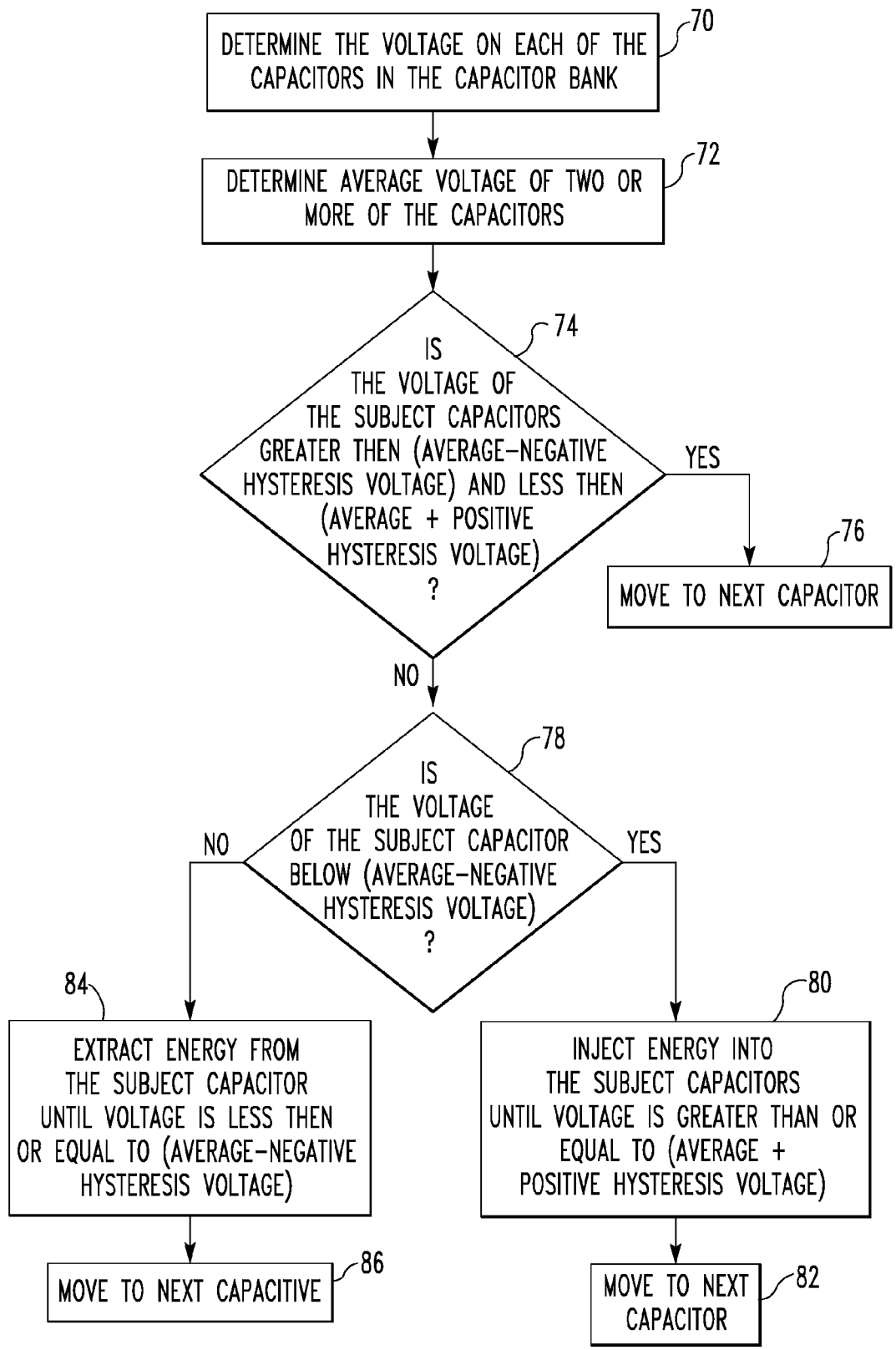
FIG. 9 is a flowchart showing a method of operating the capacitor balancing circuit of FIGS. 3A-3C according to another exemplary embodiment of the invention.
Figure 10:
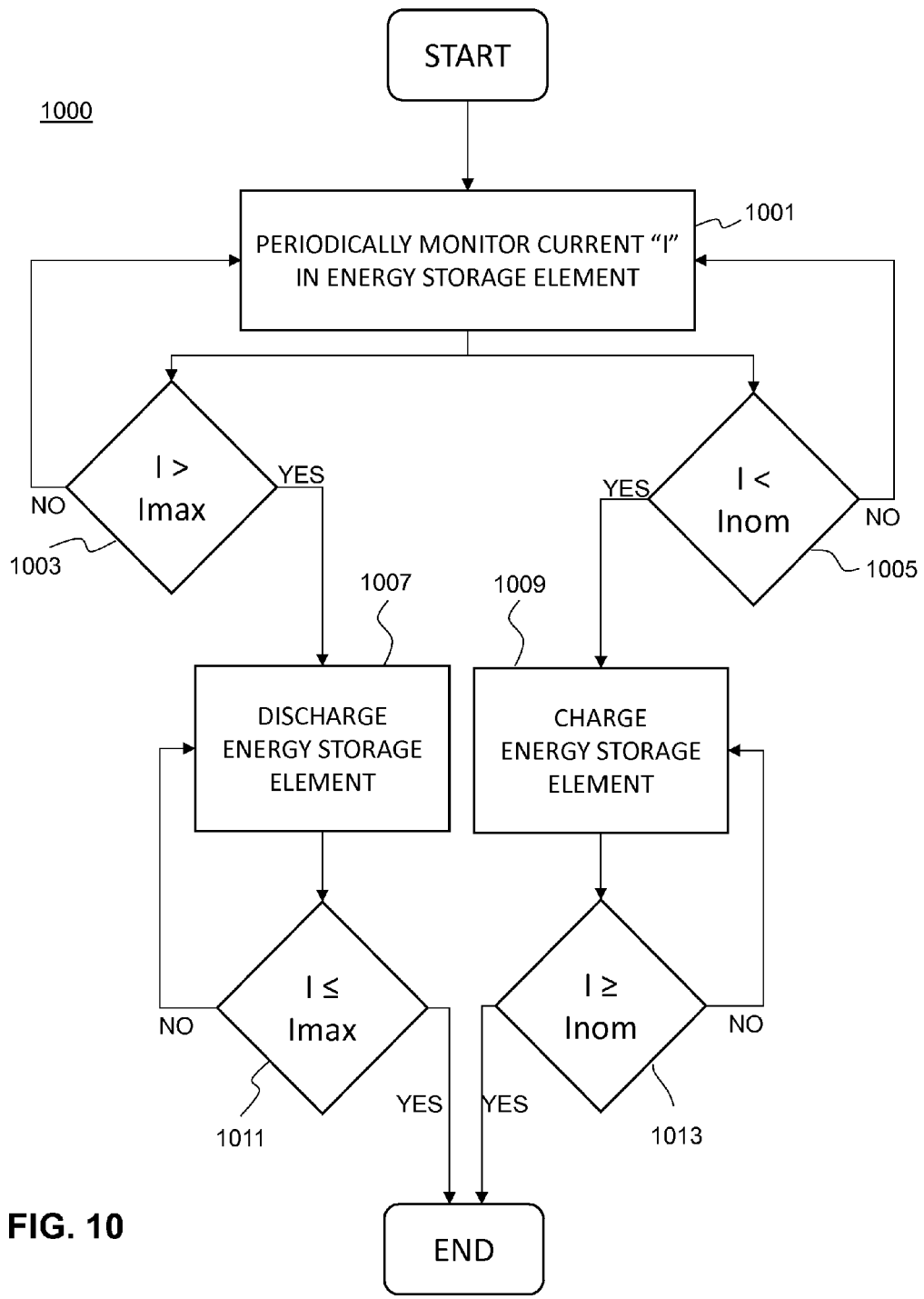
FIG. 10 is a flow chart illustrating a method of enhancing either the method of FIG. 4 or the method of FIG. 9.

Referring now to FIG. 10, in one particular embodiment, the method of FIG. 4 (or that of FIG. 9) is enhanced by also periodically monitoring (1001 in method 1000) the level of current in temporary current sourced energy storage element 42 at that instant in order to regulate energy levels in the current sourced energy storage element. If the level of current is above some predetermined first threshold amount $I_{max}$ (1003), then apply a DC voltage from any combination of DC link capacitor levels to the energy storage element 42 to discharge the energy storage element 42 (YES at 1003 and 1007) until level of current in temporary current sourced energy storage element 42 equals or falls below the predetermined first threshold amount $I_{max}$ (YES at 1011). This injection of energy is accomplished by controlling the states of the switching devices Q1-Q8 so that energy is caused to be injected into all of the capacitors 12A, 12B, 12C, 12D via the second current carrying means described above. If the level of current is below some predetermined second threshold amount $I_{norm}$(10005), then apply a DC voltage from any combination of DC link capacitor levels to the energy storage element 42 to charge the energy storage element 42 (YES at 1005 and 1009) until level of current in temporary current sourced energy storage element 42 equals or exceeds the predetermined second threshold amount (YES at 1013). This extraction of energy is accomplished by controlling the states of the switching devices Q1-Q8 so that energy is caused to be discharged from all of the capacitors 12A, 12B, 12C, 12D via the first current carrying means described above. It should be noted, that while not shown in FIG. 4, the mathematical comparisons described herein may include a tolerance band (e.g., electrical hysteresis) to prevent chattering about the threshold (e.g., first threshold amount $I_{max}$, second threshold amount $I_{nom}$).

In one particular exemplary embodiment, the method of operating capacitor balancing circuit 40 to balance the voltage on capacitors 12A, 12B, 12C, 12D based on capacitor voltage spatial second derivatives is defined and implemented using two independent finite state machines (note, capacitors 12A, 12B, 12C, and 12D are labeled 1, 2, 3, and 4, respectively, in the state machines). One state machine manages putting charge into capacitors 12A, 12B, 12C, 12D for the purposes of keeping the voltages balanced and the second state machine manages pulling charge out of the capacitors 12A, 12B, 12C, 12D for the purposes of keeping the voltages balanced. The method lends itself nicely to finite state machine implementation simply due to the fact there are a finite set of states that capacitor balancing circuit 40 can be in at any one time.

Figure 3B:
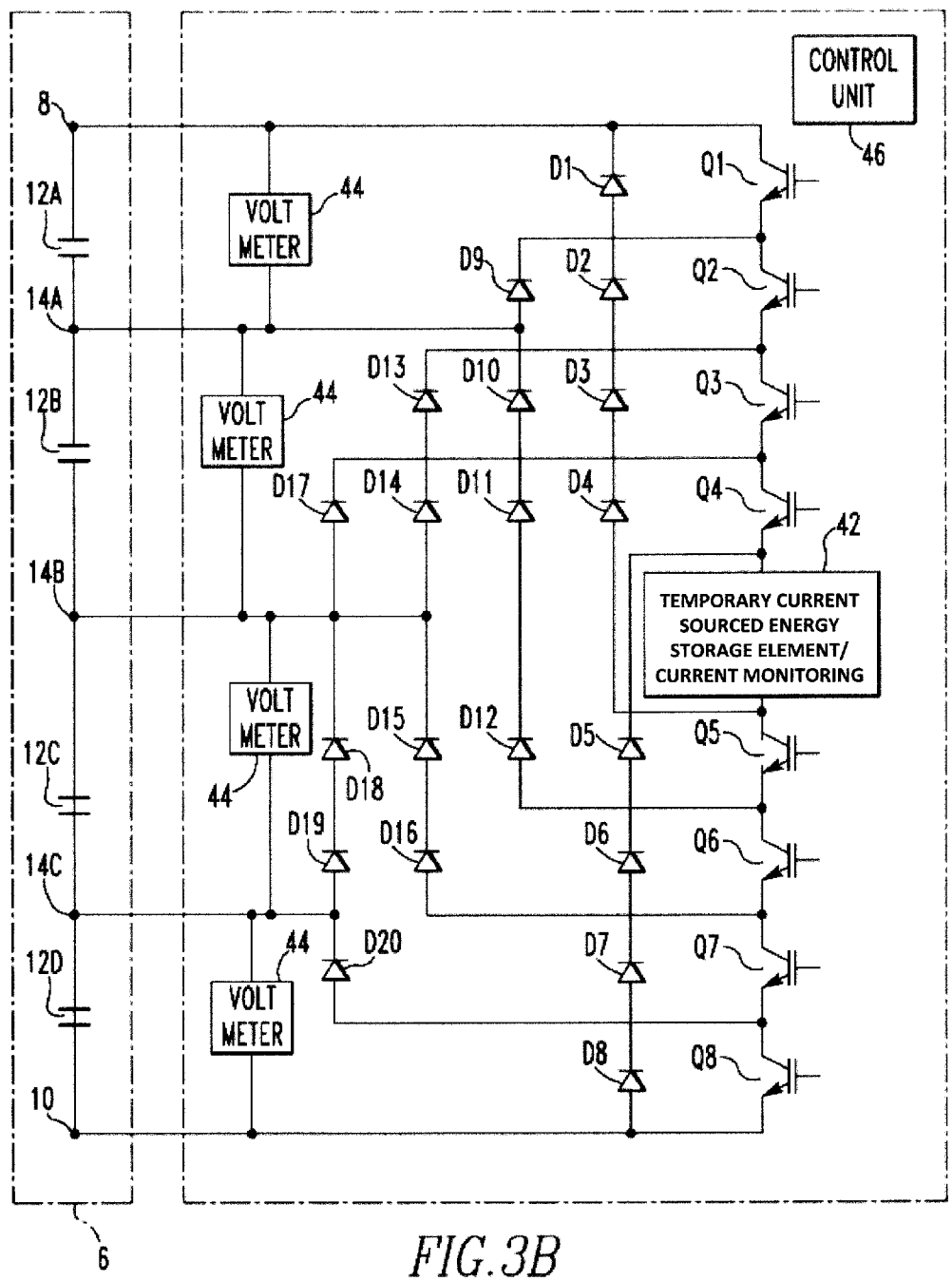
Figure 5:
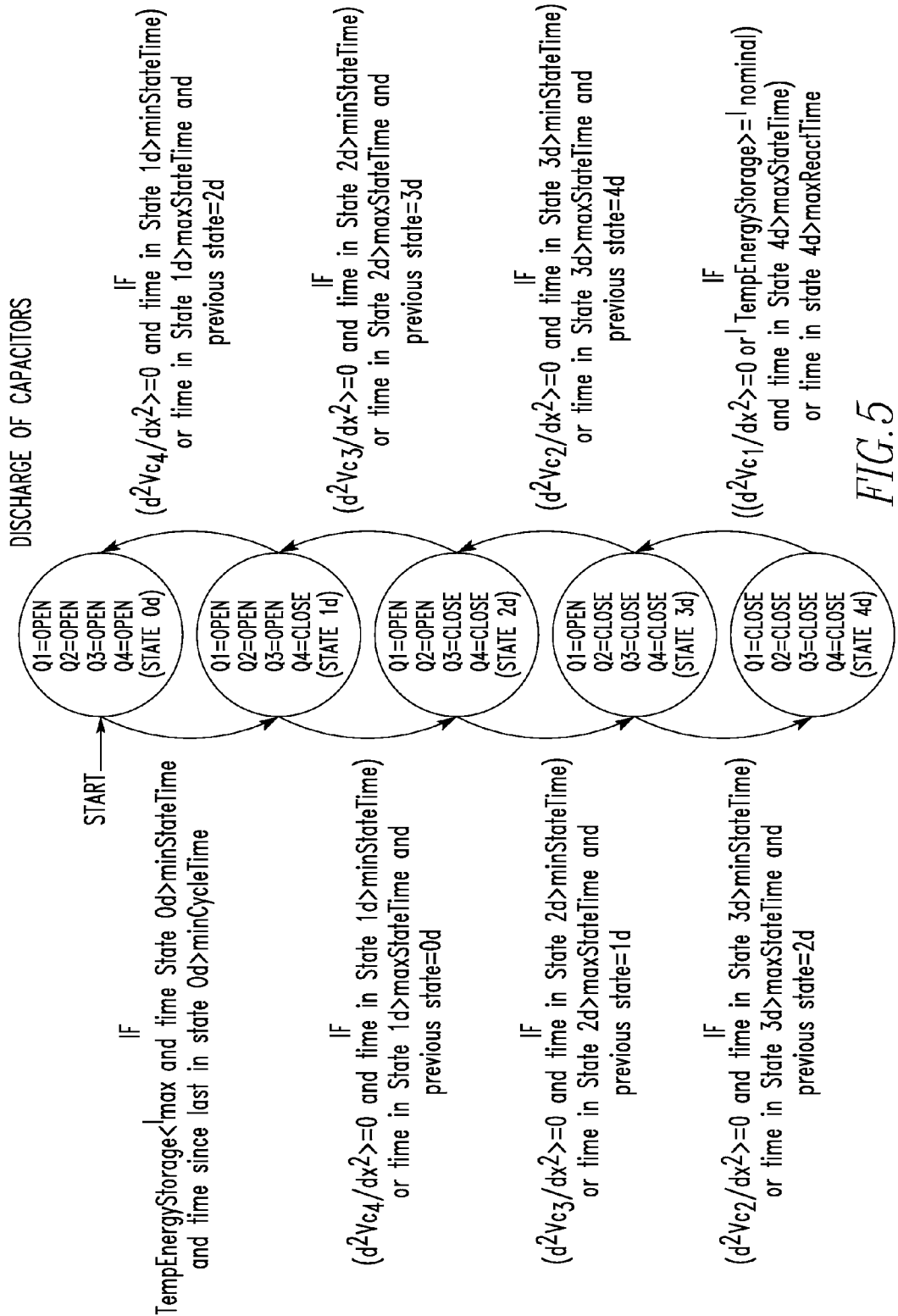
FIGS. 5-8 are diagrams of finite state machines showing operation of the capacitor balancing circuit of FIGS. 3A-3C according to one particular embodiment of the invention.
Figure 6:
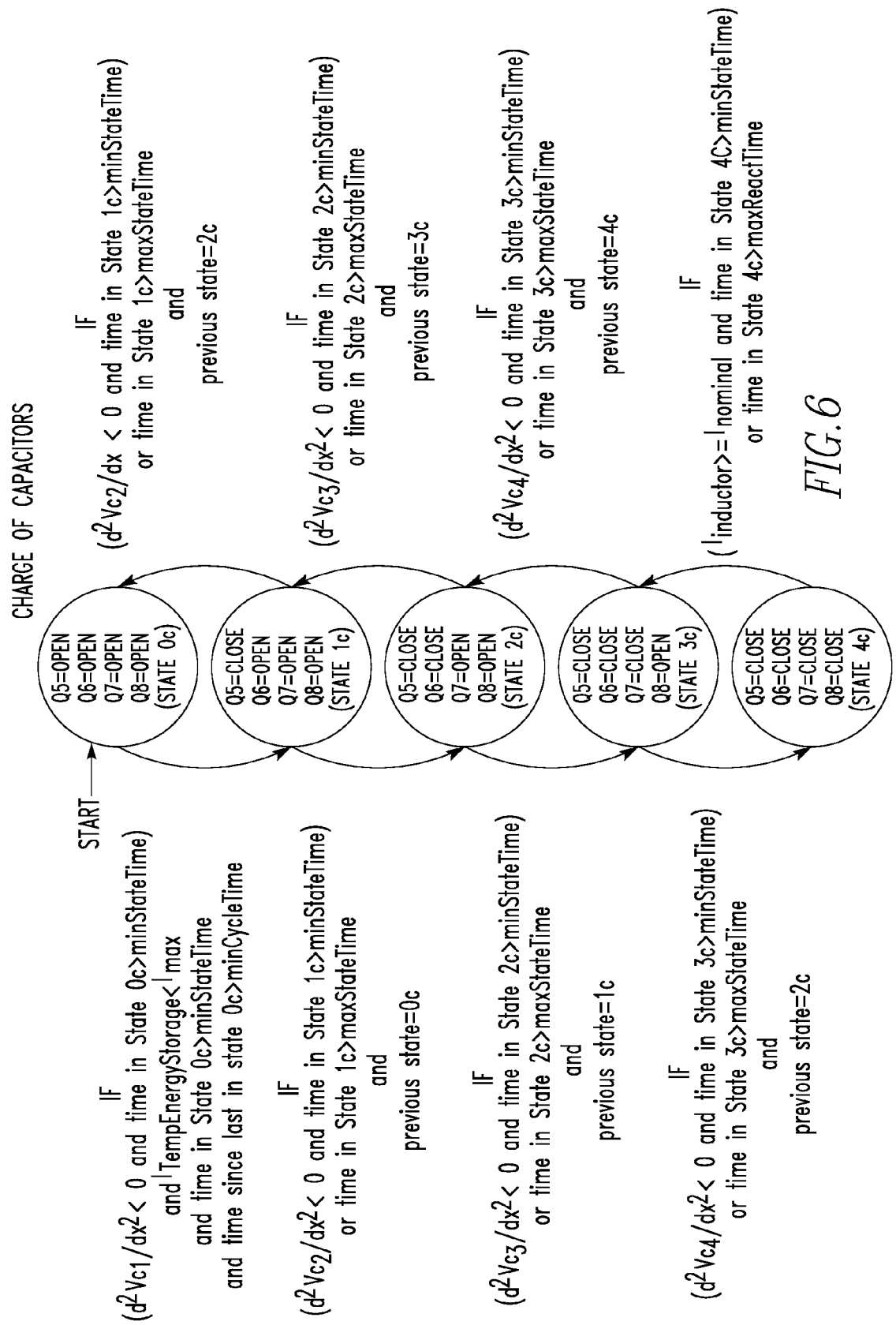

FIG. 5 illustrates the finite state machine that controls capacitor discharge functionality and FIG. 6 illustrates the finite state machine that controls capacitor charge functionality for the 5-level case of FIGS. 3A and 3B. In the state machine diagrams, the circles represent the different valid states in which capacitor balancing circuit 40 can operate. Inside the each state circle is a list of the relevant switching devices (Q1-Q8) and their corresponding open/closed states. In other words, to the capacitor balancing circuit 40, a state is defined as the corresponding open/closed states of each switching device. Capacitor balancing circuit 40, under control of control unit 46, can transition into a different state if a certain set of conditions are met. In the finite state machine diagrams of FIGS. 5 and 6, the transitions are denoted by directional arrows. The set of logical conditions that must be met in order for the transitions to occur are positioned next to each of corresponding transition arrow. It should be noted that the valid states in which capacitor balancing circuit 40 can operate are only a subset of all possible switch combinations. The system states that contain invalid switch states are not shown in any of the finite state machine diagrams.

In the finite state machine diagrams of FIGS. 5 and 6, the following common finite state machine definitions apply. $I_{TempEnergyStorage}$ is the amount of current passing through temporary current sourced storage element 42 at any given time. $I_{max}$ is a threshold defining the maximum amount of current that is allowed to pass through the temporary current sourced storage element 42 at any given time. $I_{nom}$ is a threshold defining the nominal amount of current that is desired to pass through the temporary current sourced storage element 42 at any given time. minStateTime is a threshold defining the minimum amount of time the control system must spend in a specific state before it can transition to a new state. maxStateTime is a threshold defining the maximum amount of time the control system is allowed to spend in a specific state before it must transition to a new state. maxReactTime is a threshold defining the maximum amount of time the control system is allowed to spend in a reactor charging or discharging specific state before it must transition to a new state. minCycleTime is a threshold defining the minimum amount of time the control system must spend in the initial state before it can begin a new state machine loop. $I_{max}$, $I_{nom}$, minStateTime, maxStateTime, maxReactTime and minCycleTime are all configurable thresholds in the control system. As discussed elsewhere herein, in the exemplary embodiment, $d^2 Vc_N/dx^2$ is the second derivative of the Nth capacitor voltage with respect to position with any two other one of the capacitors. For illustrative purposes, the two nearest neighboring capacitors will be used in the description of the present particular, non-limiting exemplary embodiment. For capacitor $c_1$, if the two nearest neighboring capacitors are employed, its positional neighbors are considered to be $c_2$ and $c_{N-1}$. For capacitor $c_{N-1}$, its two nearest positional neighbors are considered to be $c_{N-2}$ and $c_1$. For all other arbitrary capacitors $c_Z$, their two nearest positional neighbors are considered to be $c_{Z-1}$ and $c_{Z+1}$. Thus, $d^2 Vc_1/dx^2 = (Vc_{N-1}) - (2*Vc_1) + (Vc_2)$; $d^2 Vc_{N-1}/dx^2 = (Vc_1) - (2*Vc_{N-1}) + (Vc_{N-2})$; and $d^2 Vc_Z/dx^2 = (Vc_{Z-1}) - (2*Vc_Z) + (Vc_{Z+1})$.

Figure 3C:
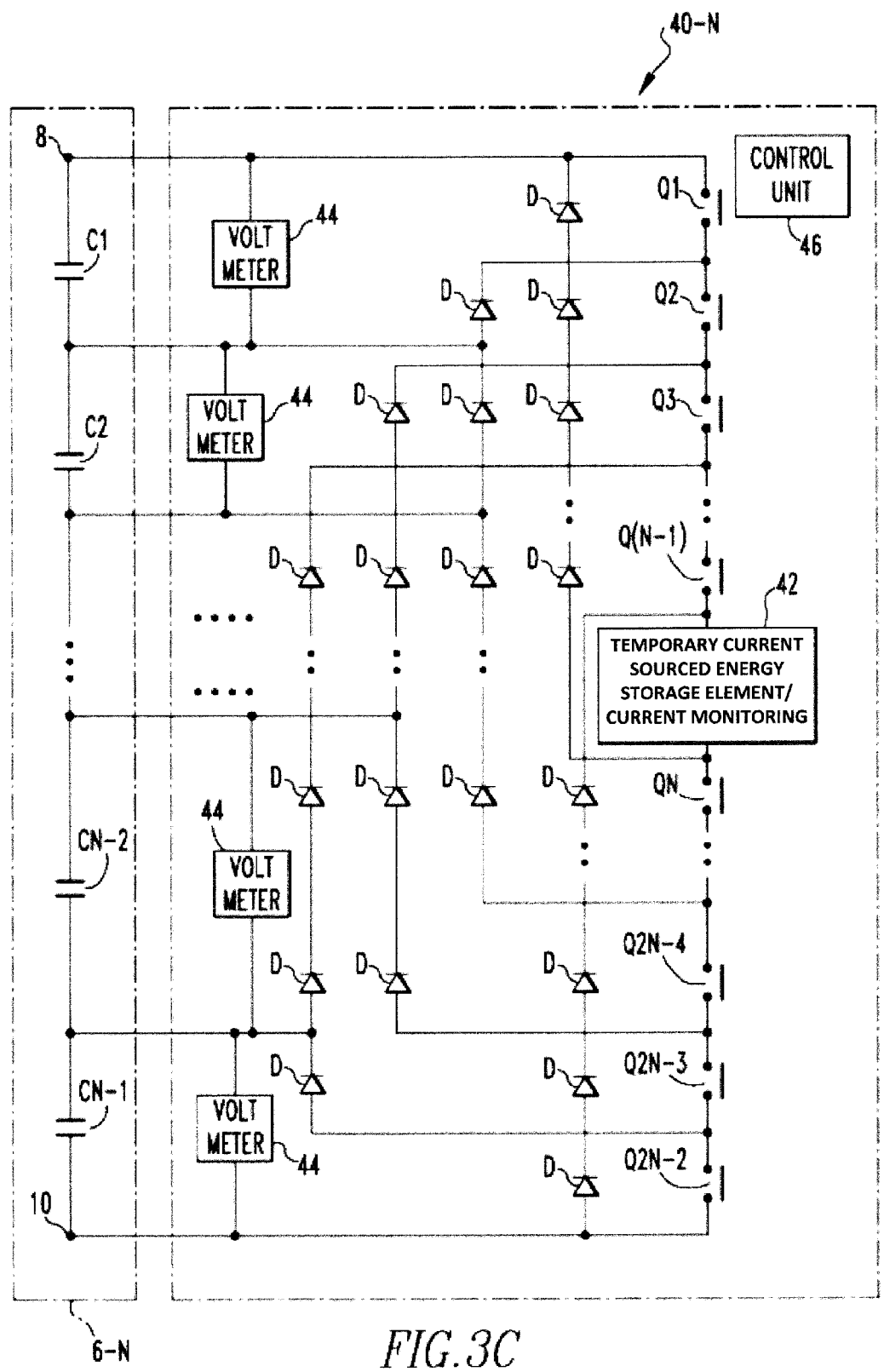
Figure 7:
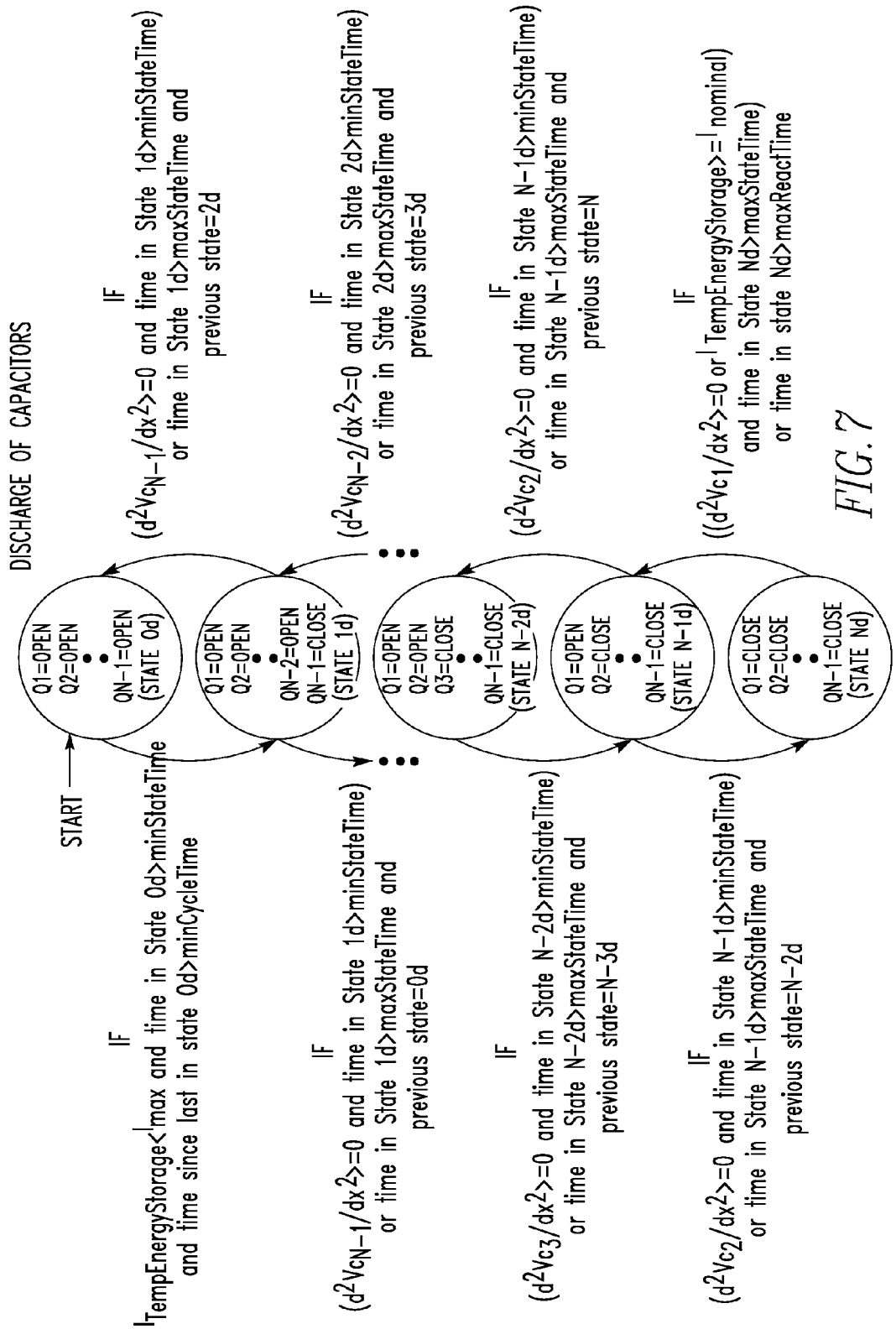
Figure 8:
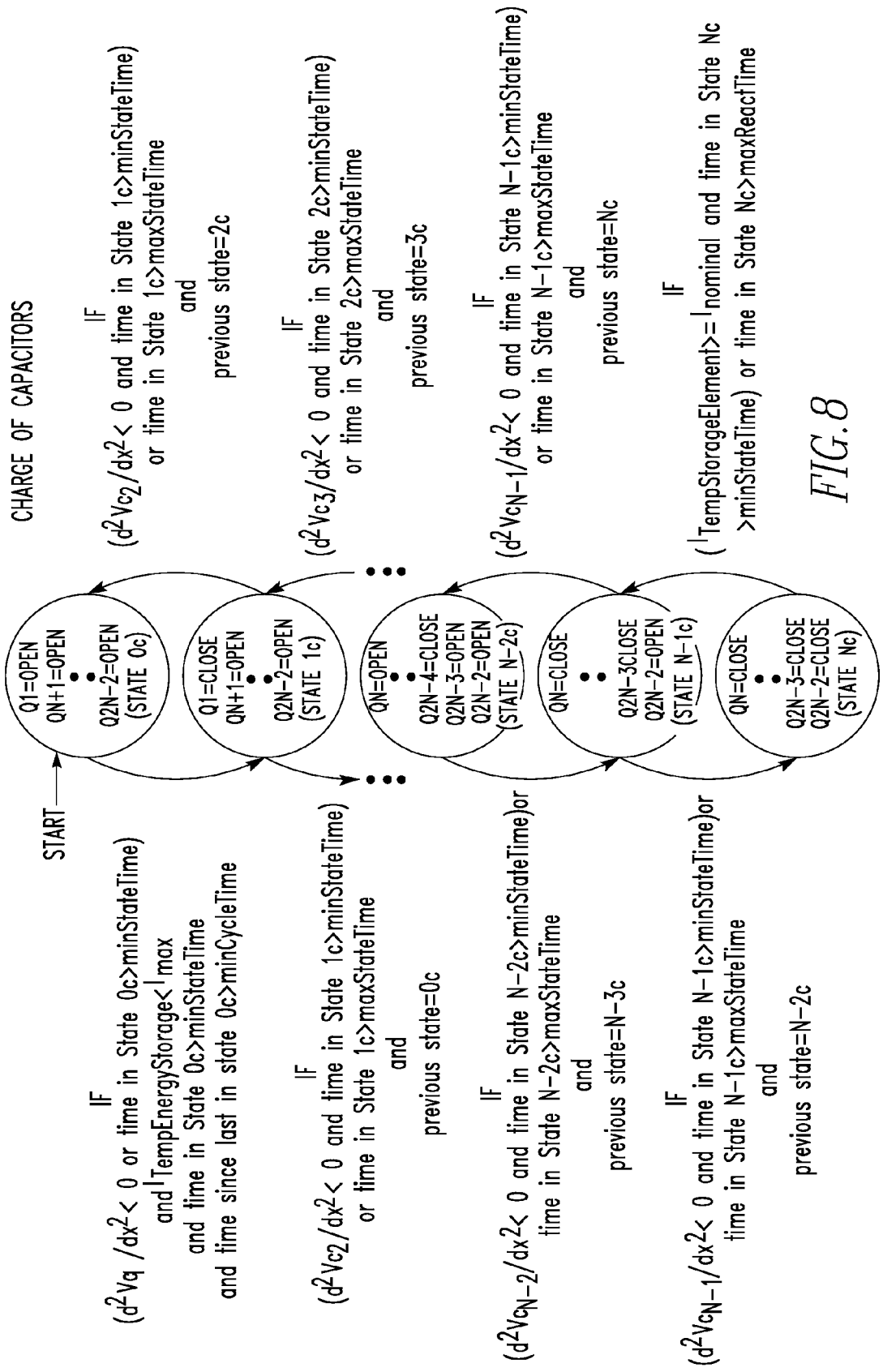

FIG. 3C is a schematic diagram showing a capacitor balancing circuit 40-N coupled to capacitor bank 6 wherein capacitor balancing circuit 40-N is extended for an N-level NPC multilevel inverter. In addition, FIG. 7 illustrates a finite state machine that manages the capacitor discharge functionality for capacitor balancing circuit 40-N, and FIG. 8 illustrates a finite state machine that manages the capacitor charge functionality for capacitor balancing circuit 40-N according to one particular embodiment.

FIG. 9 is a flowchart showing a method of operating capacitor balancing circuit 40 to balance the voltage on capacitors 12A, 12B, 12C, 12D according to an alternative exemplary embodiment of the invention. As described below, the method of FIG. 9 determines whether to inject energy into or discharge energy from a particular capacitor 12A, 12B, 12C, 12D based on a comparison of the voltage of the subject capacitor to the average voltage of two or more of the capacitors (which, in the exemplary embodiment, may include the subject capacitor or, alternatively, which may be only two or more of the other remaining (non-subject) capacitors). As will be appreciated, in the exemplary embodiment, the method is implemented in a number of software routines in control unit 46.

More specifically, referring to FIG. 9, the method, as applied to one particular capacitor 12A, 12B, 12C, 12D (for illustrative purposes, capacitor 12A will be used), and as implemented in control unit 46 begins at step 70, wherein the voltage on each of the capacitors 12A, 12B, 12C, 12D is determined by the associated volt meter 44 and provided to control unit 46. Next, at step 72, the average voltage of two or more of the capacitors (any two of 12A, 12B, 12C, and 12D) is determined. In the exemplary embodiment, the average of all of the capacitors (12A, 12B, 12C, 12D) is determined. It will be appreciated, however, that the average of less than all of the capacitors (e.g., some subset of 12A, 12B, 12C, 12D) may also be used.

Next, at step 74, a determination is made as to whether the voltage of the subject capacitor is greater than the average voltage minus a negative hysteresis voltage and less than the average voltage plus a positive hysteresis voltage. If the answer is yes, then the method proceeds to step 76, where the method is repeated for the next capacitor 12A, 12B, 12C, 12D (e.g., 12B).

If the answer at step 74 is no, then the method proceeds to step 78, where a determination is made as to whether the voltage of the subject capacitor is below the average voltage minus a negative hysteresis voltage. If the answer is yes, then the method proceeds to step 80. At step 80, energy is injected into the subject capacitor (12A) from temporary current sourced energy storage element 42 until the voltage of the subject capacitor (as continually monitored) becomes greater than or equal to the average plus a positive hysteresis voltage (as continually monitored). This injection of energy is accomplished by controlling the states of the switching devices Q1-Q8 so that energy is caused to be injected into the appropriate capacitor (12A in the example) via the second current carrying means described above. Once the voltage of the subject capacitor becomes greater than or equal to the average plus a positive hysteresis voltage, the method proceeds to step 82, where the method is repeated for the next capacitor 12A, 12B, 12C, 12D (e.g., 12B). Alternatively, at step 80, energy may injected into the subject capacitor (12A) from temporary current sourced energy storage element 42 until the voltage of the subject capacitor (as continually monitored) becomes greater than or equal to the average minus a negative hysteresis voltage (as continually monitored).

If the answer at step 78 is no, then that means that the voltage of the subject capacitor is above the average voltage plus a positive hysteresis voltage, and the method proceeds to step 84. At step 84, energy is extracted from (i.e., discharged from) the subject capacitor (12A) into temporary current sourced energy storage element 42 until the voltage of the subject capacitor (as continually monitored) becomes less than or equal to the average minus a negative hysteresis voltage (as continually monitored). This extraction of energy is accomplished by controlling the states of the switching devices Q1-Q8 so that energy is caused to be discharged from the appropriate capacitor (12A in the example) and into temporary current sourced energy storage element 42 via the first current carrying means described above. Once the voltage of the subject capacitor becomes less than or equal to the average minus a negative hysteresis voltage, the method proceeds to step 86, where the method is repeated for the next capacitor 12A, 12B, 12C, 12D (e.g., 12B). Alternatively, at step 84, energy may extracted from (i.e., discharged from) the subject capacitor (12A) into temporary current sourced energy storage element 42 until the voltage of the subject capacitor (as continually monitored) becomes less than or equal to the average plus a positive hysteresis voltage (as continually monitored).

In addition, the enhancement discussed elsewhere herein that employs periodically monitoring the level of current in temporary current sourced energy storage element 42 may also be used with the method of FIG. 9.

While the exemplary implementation just described is based on two independent finite state machines, it should be recognized, however, that the functions of charging or discharging capacitors 12A, 12B, 12C, 12D for the purposes of voltage balancing are not strictly independent. Thus, it is possible to join each of the two independent finite state machines into a single finite state machine that would manage both charging and discharging of the capacitors 12A, 12B, 12C, 12D. While it is recognized that a single finite state machine scheme would require a more complex software implementation, it is to be understood that such an alternative implementation is within the scope of the present invention.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for regulating voltages in an electronic device, the method comprising:
    balancing, by a circuit, a selected capacitor comprised in a plurality of capacitors by performing an operation from the group consisting of (i) injecting energy from an energy storage element into the selected capacitor and (ii) extracting energy from the selected capacitor and storing the extracted energy into the energy storage element;
    selecting, by the circuit, the operation based on a voltage across the selected capacitor and an average voltage, the average voltage being an average of voltages across capacitors of a set of capacitors from the plurality of capacitors; and
    regulating, by the circuit, a current of the energy storage element by periodically monitoring the current and applying a voltage across a combination of capacitors from among the plurality of capacitors to the energy storage element based on a comparison of the current with a threshold current.

2. The method of claim 1, wherein the set of capacitors includes the selected capacitor.

3. The method of claim 1, wherein selecting the operation includes comparing the voltage across the selected capacitor with a threshold voltage.

4. The method of claim 3, wherein the threshold voltage is one of (i) the average voltage minus a negative hysteresis voltage and (ii) the average voltage plus a positive hysteresis voltage.

5. The method of claim 1, wherein the operation is injecting energy from the energy storage element into the selected capacitor when the voltage across the selected capacitor is lower than the average voltage minus a negative hysteresis voltage.

6. The method of claim 5, wherein injecting energy from the energy storage element into the selected capacitor is maintained until the voltage across the selected capacitor is greater than or equal to a threshold voltage.

7. The method of claim 6, wherein the threshold voltage is the average voltage plus a positive hysteresis voltage.

8. The method of claim 1, wherein the operation is extracting energy from the selected capacitor and storing the extracted energy into the energy storage element when the voltage across the selected capacitor is greater than the average voltage plus a positive hysteresis voltage.

9. The method of claim 8, wherein extracting energy from the selected capacitor is maintained until the voltage across the selected capacitor becomes less than or equal to a threshold voltage.

10. The method of claim 9, wherein the threshold voltage is the average voltage minus a negative hysteresis voltage.

11. The method of claim 1, wherein the electronic device is a multilevel power inverter.

12. The method of claim 1, wherein the set of capacitors is selected from the group consisting of (i) a subset of capacitors from the plurality of capacitors and (ii) all of the capacitors of the plurality of capacitors.

13. The method of claim 1, wherein regulating the current includes one of (i) discharging the energy storage element until a level of the current becomes equal to or less than a predetermined first threshold current and (i) charging the energy element storage element until the level of the current becomes equal to or greater than a second current threshold.

14. The method of claim 1, wherein regulating the current includes one of (i) discharging the energy storage element until a level of the current is within a first tolerance band around a first threshold current and (ii) charging the energy element storage element until the level of the current is within a second tolerance band around a second threshold current.

15. A circuit for regulating voltages in an electronic device, the circuit comprising:
    a plurality of capacitors;
    an energy storage element;
    a control unit communicatively coupled to the capacitors and to the energy storage element, the control unit being configured to (i) balance a selected capacitor from among the plurality of capacitors and (ii) regulate a current of the energy storage element;
    wherein the control unit is configured to balance the selected capacitor by performing one of (i) injecting energy from the energy storage element into the selected capacitor and (ii) extracting energy from the selected capacitor and storing the extracted energy into the energy storage element;
    wherein the control unit is configured to balance the selected capacitor based on a voltage across the selected capacitor and an average voltage, the average voltage being an average of voltages across capacitors of a set of capacitors from the plurality of capacitors; and
    wherein the control unit is configured to regulate the current of the energy storage element by periodically monitoring the current and applying a voltage across a combination of capacitors from among the plurality of capacitors to the energy storage element based on a comparison of the current with a threshold current.

16. The circuit of claim 15, wherein the set of capacitors includes the selected capacitor.

17. The circuit of claim 15, wherein balancing the selected capacitor includes comparing the voltage across the selected capacitor with a threshold voltage.

18. The circuit of claim 17, wherein the threshold voltage is one of (i) the average voltage minus a negative hysteresis voltage and (ii) the average voltage plus a positive hysteresis voltage.

19. The circuit of claim 15, wherein balancing the selected capacitor is performed by injecting energy from the energy storage element into the selected capacitor when the voltage across the selected capacitor is lower than the average voltage minus a negative hysteresis voltage.

20. The circuit of claim 19, wherein injecting energy from the energy storage element into the selected capacitor is maintained until the voltage across the selected capacitor is greater than or equal to a threshold voltage.

21. The circuit of claim 20, wherein the threshold voltage is the average voltage plus a positive hysteresis voltage.

22. The circuit of claim 15, wherein balancing the selected capacitor is performed by extracting energy from the selected capacitor and storing the extracted energy into the energy storage element when the voltage across the selected capacitor is greater than the average voltage plus a positive hysteresis voltage.

23. The circuit of claim 22, wherein extracting energy from the selected capacitor is maintained until the voltage across the selected capacitor becomes less than or equal to a threshold voltage.

24. The circuit of claim 23, wherein the threshold voltage is the average voltage minus a negative hysteresis voltage.

25. The, circuit of claim 15, wherein the electronic device is a multilevel power inverter.

26. The circuit of claim 15, wherein the set of capacitors is selected from the group consisting of (i) a subset of capacitors of the plurality of capacitors and (ii) all of the capacitors of the plurality of capacitors.

27. The circuit of claim 15, wherein regulating the current includes one of (i) discharging the energy storage element until a level of the current becomes equal to or less than a predetermined first threshold current and (i) charging the energy element storage element until the level of the current becomes equal to or greater than a second current threshold.

28. The circuit of claim 15, wherein regulating the current includes one of (i) discharging the energy storage element until a level of the current is within a first tolerance band around a first threshold current and (ii) charging the energy element storage element until the level of the current is within a second tolerance band around a second threshold current.

\* \* \* \* \*